H. OTTMANN.
PROCESS AND APPARATUS FOR PUFFING BLAST FURNACE SLAG.
APPLICATION FILED SEPT. 4, 1909.
1,003,406.
Patented Sept. 12, 1911.
2 SHEETS—SHEET 1.
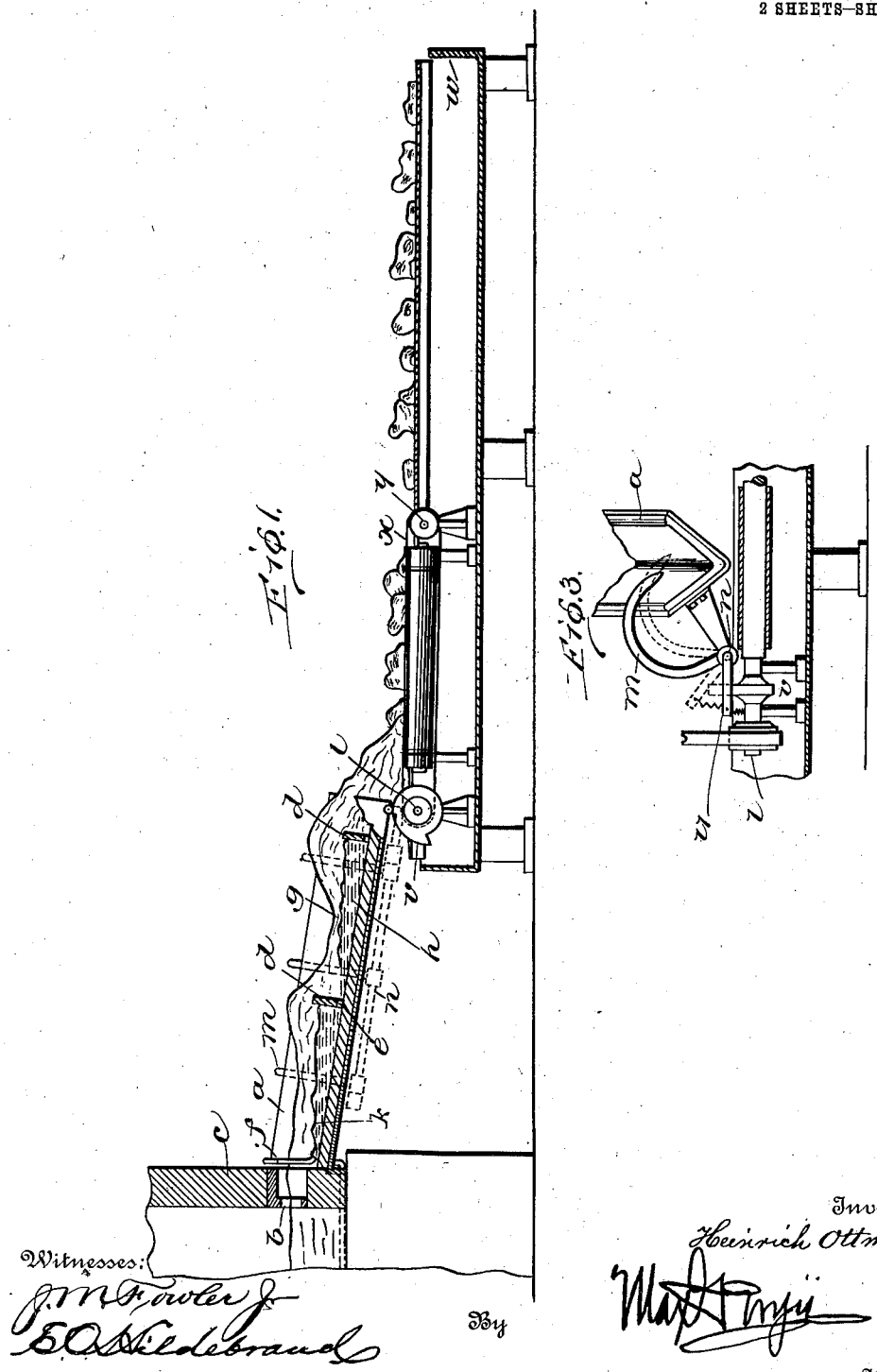

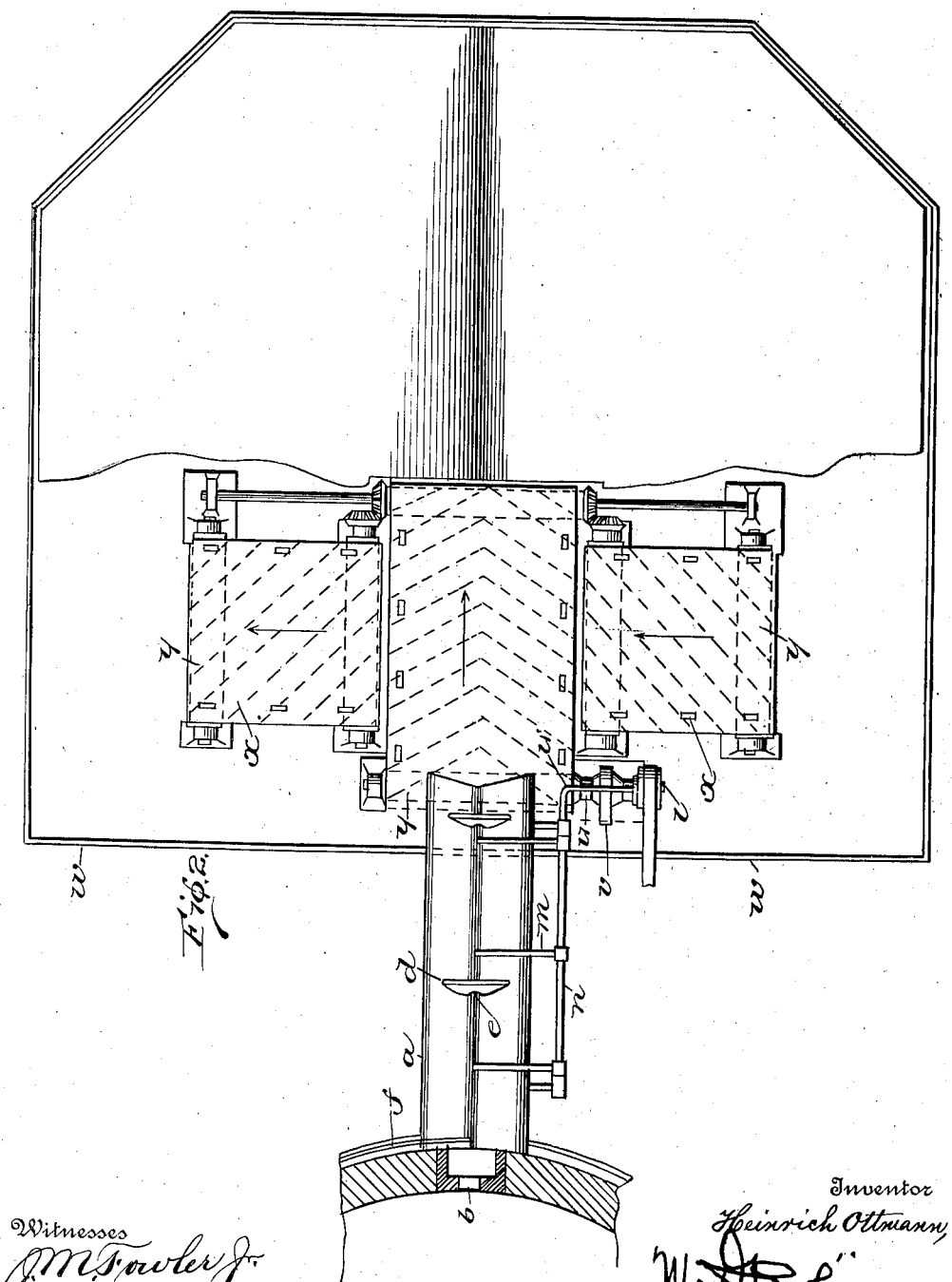

UNITED STATES PATENT OFFICE.

HEINRICH OTTMANN, OF MUNICH, GERMANY.

PROCESS AND APPARATUS FOR PUFFING BLAST-FURNACE SLAG.

1,003,406. Specification of Letters Patent. Patented Sept. 12, 1911.

Original application filed March 28, 1907, Serial No. 365,160. Divided and this application filed September 4, 1909. Serial No. 516,313.

*To all whom it may concern:*

Be it known that I, HEINRICH OTTMANN, citizen of Germany, residing at Munich, Bavaria, Germany, have invented certain new and useful Improvements in Processes and Apparatus for Puffing Blast-Furnace Slag, being a division of pending application, Serial No. 365,160, filed March 28, 1907; and I do hereby declare the following to be a full, clear, and exact description of the invention, such as will enable others skilled in the art to which it appertains to make and use the same.

My invention relates to a process and apparatus for treating blast-furnace slag and to the products thereby obtained.

The object of the present invention is first a process for the blowing or puffing up of blast-furnace slag, as obtained in the acid process, that is the charcoal gray iron process. This slag, when puffed up according to the present process and comminuted in a machine suitably constructed in accordance with this invention, is exceedingly well suited for the production of building and insulating material. For this purpose, the slag puffed up,—the so-called artificial pumice stone—is mixed with a binding material, which may consist, according to the purpose for which the building material is to be employed, of cement, lime, gypsum, asphalt, magnesia, silicates, pitch, tar-products or the like. For example, a building material made from such slag and cement, lime or silicates may be used with advantage for the production of fire proof masonry such as walls, roofs, floors, plates, for the vaulting in of staircases, the lining of iron construction, the building and insulating of cellars, ice-houses, cold-storage plants, steam boiler coverings and the like.

Since this artificial pumice stone has only a very small specific gravity and yet shows a relatively great strength, it is especially suitable also for the production of the lightest kind of masonry, as is required for projections, bay-windows, partition walls and the like.

Finally, the material produced according to the present invention has exceedingly good insulating properties and therefore, is especially suitable as a heat insulating material in place of cork, infusorial earth, peat-meal and the like.

The artificial pumice stone is produced, according to the present invention, from the slag flowing from the furnace working the gray-iron process, by bringing the incandescent slag into contact with water, which partly vaporizes, or turns into steam, at once and changes the slag, by blowing or puffing it up, into an immediately congealing porous mass of limited specific gravity.

For carrying out this process the apparatus shown in the accompanying drawings is advantageously employed.

In the drawings Figure 1 is a side elevation, Fig. 2 a plan, and Fig. 3 a detail end view of a machine for treating the molten slag.

The apparatus consists essentially of a trough or conduit $a$ of angular cross-section as shown, and of fire proof material, which trough is arranged at a slope in front of the tap-hole $b$ of the blast furnace. In the trough itself are placed one or more cross-strips or riffles $d$, which extend upward about two-thirds the depth of the trough and are provided at the bottom with openings $e$. Water is led into the bottom of this angular trough, below the slag, for example, in the present instance below the slag through a conductor or pipe $f$, Figs. 1 and 2, which water may be taken with advantage from the cooling water of the blast-furnace.

The operation is as follows:

The slag $g$ passes from the blast-furnace $c$ through the opening $h$ into the trough $a$ and dams up against the riffles $d$. At the point of contact of the slag $g$, with the water $h$, there is formed at once in consequence of the cooling, a thin glass-like stratum which prevents the molten slag and the water from mixing the water entering at a point below where the slag issues. This stratum, which is indicated in Fig. 1 by thick line $k$, is now perforated by an apparatus, shown in front view in Fig. 3 and driven from a shaft $l$, whereby the hot and partly vaporized water can come into contact with the hot slag and blow or puff it up.

In the present example, the apparatus consists of a plurality of teeth or tines $m$, Figs. 1 and 3, which are mounted upon a common axle $n$, suitably journaled adjacent the trough. This is oscillated by means of a cam $v$, keyed upon the shaft $l$ and acting against one end of the axle $u$, which is bent to form a crank-arm as indicated at $u'$ Fig. 3. By this means the entire mass of slag is puffed up or made as porous as possible by the water. Obviously, the perforations or punching of the mass can be done manually, as for example, by picks or the like. The mass is then spread out upon larger sheet metal or similar plates, located in front of the trough in order to solidify thoroughly. In order to obtain a proper sub-division of the mass, endless bands $x$ consisting of wire fabric, and running around rollers or drums $y$, driven by means of bevel gear wheels from the shaft $l$, are arranged at the end of the trough. In the present example, three bands are provided, which move in the direction of the arrows, so that by this arrangement a rapid cooling and sub-division of the mass can take place upon a sheet metal plate or reservoir arranged above the chambers $w$, as shown, said plate or reservoir being advantageously sloped slightly.

It is to be noted further that the water which is necessary for the formation of the pumice stone, can also be led to the slag from above, for example, through suitable spraying ducts arranged at the trough.

Since the pieces of pumice stone are of irregular size and therefore, without further treatment, unsuitable for most building purposes, they are broken into pieces of substantially equal size in a crushing machine of any suitable kind.

According as the material obtained in the above way is to be employed as building or as insulating material, it is mixed as already explained, with suitable binding material, such as cement, gypsum, asphalt or the like for building material, or with silicate, pitch or the like for insulating material.

In making the mixture, the materials must be thoroughly incorporated and then finally brought into the desired form under pressure, the pressure being maintained until the materials harden or set.

Preferably four to ten parts of the crushed porous slag are mixed with about one part of the binding material. If the body thus obtained is not water-proof, as for example, is the case when cement is employed as a binding material, it can be made water-proof by coating or saturating it with a water-proofing material such as asphalt, pitch, tar and the like. The body so obtained is remarkable for its exceedingly great porosity and, therefore, its light specific gravity. It contains or incloses a certain quantity of dead air, whose presence essentially adds to the insulating properties of the material. Insulating bodies of this kind which are made with the help of cement or silicates are especially resistant against the influences of the atmosphere, water and fire.

Having thus fully described my invention, what I claim is:—

1. The process which consists in treating molten slag from a blast-furnace working the gray-iron process with water, while simultaneously puncturing the mass, substantially as described.

2. The process of treating blast furnace slag which consists in introducing water into the interior of a coherent mass of the molten slag.

3. The process of treating blast furnace slag which consists in superposing a layer of the molten slag upon a body of water and disturbing the area of contact between the two.

4. The process of treating blast furnace slag which consists in superposing a layer of the molten slag upon a confined layer of water and puncturing the mass to disrupt the area of contact between the two.

5. The combination with a blast furnace having a slag outlet, of a trough arranged to conduct the slag from said outlet, and means for feeding water into said trough into contact with and below the slag in close proximity to the slag outlet of the blast furnace.

6. The combination, with a blast furnace having a slag outlet, of a trough of angular cross-section arranged to conduct the slag from said outlet, and means for feeding water into said trough beneath the slag therein and in close proximity to the slag outlet.

7. The combination, with a blast furnace having a slag outlet, of a trough arranged to conduct the slag from said outlet, means in said trough for damming back the slag, and means for supplying water to said trough below the slag and in close proximity to the slag outlet.

8. The combination, with a blast furnace having a slag outlet, a conduit for conducting the slag from said outlet, and means for supplying water to the slag in said conduit, of means for puncturing said slag in said trough.

9. The combination, with a blast furnace having a slag outlet and a conduit for conducting slag from said outlet, of means for supplying water below the slag in close proximity to the slag outlet, an endless band of wire fabric arranged to receive the slag from said conduit, and means for moving said endless band.

10. The combination, with a blast furnace having a slag outlet, and a conduit for conducting slag from said outlet, of means for supplying water below the slag in close proximity to the slag outlet, a plurality of endless bands of wire fabric one arranged to move in one direction and to receive the slag from the conduit, and the remainder to move in another direction and to receive the slag from the first mentioned belt, and means for driving said belts.

11. The combination, with a blast furnace having a slag outlet, of a trough of angular cross-section arranged to conduct the slag from the said outlet, means in said trough for damming back the slag, and means for supplying water to said trough below the slag in close proximity to the slag outlet.

12. The combination, with a blast furnace having a slag outlet, of a conduit for conducting the slag from said outlet, means for supplying water to said conduit below the slag and in close proximity to the slag outlet, and means for puncturing said slag in said trough.

13. The combination, with a blast furnace having a slag outlet, and a trough angular in cross-section, for conducting said slag from said outlet, of means for supplying water to said conduit below the slag and in close proximity to the slag outlet, and means for puncturing said slag in said trough.

14. The combination, with a blast furnace having a slag outlet, and a conduit for conducting the slag from said outlet, of means in said trough for damming the slag back, means for supplying water below the slag in said conduit, and means for puncturing the slag in the said conduit.

In testimony whereof I hereunto affix my signature in the presence of two witnesses.

HEINRICH OTTMANN.

Witnesses:
ABRAHAM SCHLESINGER,
LOUIS F. MUELLER.